Figure 1:
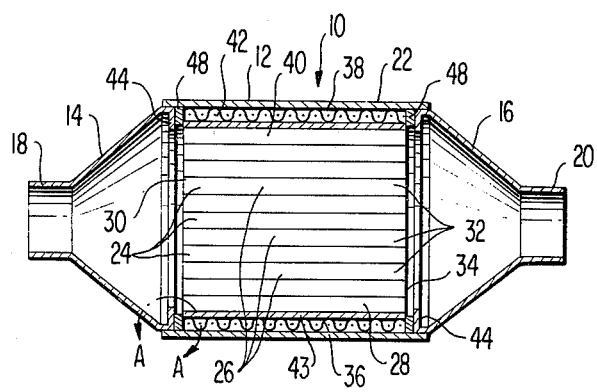

United States Patent [19]

Stawsky

[11] 3,948,611
[45] Apr. 6, 1976

[54] CATALYTIC CONVERTER HAVING HOLLOW, GAS-FILLED MOUNTING MEANS FOR A MONOLITHIC CATALYST

[75] Inventor: Alfred Stawsky, Bronx, N.Y.

[73] Assignee: Engelhard Minerals & Chemicals Corporation, Murray Hill, N.J.

[22] Filed: June 10, 1974

[21] Appl. No.: 478,059

[52] U.S. Cl. ............ 23/288 FC; 23/288 F; 60/299; 60/322
[51] Int. Cl.² ...................... B01J 8/02; F01N 3/15
[58] Field of Search ............ 23/288 FC; 60/299, 322

[56] References Cited
UNITED STATES PATENTS

| 2,850,365 | 9/1958 | Adey et al. ............ 23/288 FC |
| 3,211,534 | 10/1965 | Ridgway ............ 23/288 FC |
| 3,687,224 | 8/1972 | Lundin............................ 181/72 X |
| 3,754,870 | 8/1973 | Carnahan et al. ............ 23/288 FC |
| 3,798,006 | 3/1974 | Balluff ............ 23/288 FC |
| 3,814,589 | 6/1974 | Heitland ............ 23/288 FC |
| 3,838,977 | 10/1974 | Warren............. 23/288 F |

Primary Examiner—Barry S. Richman
Assistant Examiner—Bradley Garris

[57] ABSTRACT

A catalytic gas treatment apparatus in which a unitary catalytic element, having gas flow paths therethrough, is positioned within a surrounding casing. At least one, and preferably two, end flanges are provided and are positioned in a direction inwardly with respect to the casing and are adjacent the catalytic element end faces. Expansible and/or resilient retention members are positioned between the end flanges and the catalytic element end faces to expand as differences in thermal expansion rates result in differences in the distance between the end flanges and the catalytic element end faces. Consequently, untreated gas cannot pass between the catalytic element outer surface and the casing inner surface, and damage of the catalytic element end faces by the end flanges is lessened during vibration of the apparatus while operating at a high temperature. In one embodiment, the expansible retention members are bimetallic washers shaped similar to a Belleville spring, while in another embodiment, they are hollow, gas-filled, thin metal shell pleated gaskets.

7 Claims, 4 Drawing Figures

U.S. Patent    April 6, 1976    3,948,611

CATALYTIC CONVERTER HAVING HOLLOW, GAS-FILLED MOUNTING MEANS FOR A MONOLITHIC CATALYST

This invention relates to a catalytic apparatus suitable for purifying gases, and the device finds particular utility in the treatment of exhaust gases from internal combustion engines in order to decrease pollution of the atmosphere.

Gases of various sorts are often discharged or exhausted into the air and frequently these gases serve to add undesirable materials or pollutants to the atmosphere. Although the problem has been under study for years, and many different types of devices have been devised for combating the difficulty, it is becoming increasingly important that such pollution be avoided.

A particular problem resides in the purification of exhaust gases emanating from internal combustion engines such as those employed in automotive vehicles. The exhaust products from the engines, which usually burn a hydrocarbon fuel such as hydrocarbon gases, gasoline or diesel fuel, can cause serious pollution of the atmosphere. Among the pollutants in these exhaust gases are hydrocarbons and oxygen-containing compounds, the latter including nitrogen oxides and carbon monoxide. The removal of these contaminants from the gases or the conversion of the pollutants to less objectionable materials is of significant importance to the well-being of our society.

U.S. Pat. No. 3,441,381 is directed to a catalytic apparatus which has been employed to purify various gases such as exhaust gases, and the device is particularly efficacious in the treatment of exhaust gases emanating from internal combustion engines which burn hydrocarbon or other fuels. Briefly, the device has a casing section which houses a unitary catalyst having a plurality of gas flow channels or paths therethrough. A gas inlet and outlet are provided at their respective ends of the casing. The outside diameter of the catalytic element, which is generally of the same cross-section as the casing, is somewhat smaller than the internal dimension of the casing in order to permit placement of the catalytic element in the casing after each of these members has been separately formed.

In order to hold the catalytic element tightly within the casing a resilient, flexible member is positioned under compression in the annular space between the casing and the catalyst. The catalytic element is often made of a refractory, ceramic material, while the casing is metallic. In a very practical form of the apparatus, the resilient, flexible member is a corrugated metallic structure which is foraminous such as a corrugated, knitted, metallic mesh fabric.

In a preferred device of U.S. Pat. No. 3,441,381, each end of the catalytic element is in contact with a flange which extends in a direction inwardly with respect to the casing. These flanges extend around the inner circumference of the casing and bridge the space between the casing and the catalytic element and sufficiently across the respective faces of the latter to hold it against longitudinal movement within the casing. Also, it is desired that the flanges keep the gas which is being treated from bypassing the catalytic element by blocking each end of the annular space between the catalytic element and the casing so that the gases cannot avoid passing through the catalytic element as they travel from the inlet to the outlet of the device.

Although the apparatus of U.S. Pat. No. 3,441,381 has given excellent service in purifying the exhaust of commercial vehicles employing internal combustion engines, there are circumstances in which the catalytic element is damaged during operation. The exit end face of the catalytic element is sometimes damaged due to grinding action, resulting because the catalytic element may rotate or otherwise move within the casing while in contact with the holding flange. U.S. Pat. No. 3,692,497 discloses a catalytic device including means for preventing rotation of the catalytic element within a circular cylindrical casing, thereby eliminating or reducing the grinding action and the resultant damage. Damage from other causes still can occur, however. During operation of the catalytic exhaust treatment apparatus, high operating temperatures are encountered, for example temperatures of up to about 800°C. and even higher. As is well known, many materials expand with increased temperature. Since different materials expand at different rates as temperature increases, the casing and the catalyst element expand at different rates. The apparatus of U.S. Pat. No. 3,441,381 maintains satisfactory integrity between the casing and the catalytic element during radial expansion with increased temperature. Longitudinal expansion is also experienced, however. This longitudinal expansion results in the holding flanges no longer being positioned snugly against the ends of the catalytic element. Two undesirable things result. First, a portion of the exhaust gas is able to enter the area between the casing and the catalytic element, thus not being subjected to the catalytic action. Second, vibration of the catalytic device may cause damage to the ends of the catalytic element because they bump the holding flanges. U.S. Pat. No. 3,692,497 discloses means for inhibiting longitudinal movement of the catalytic element within a cylindrical casing. This patent, however, is primarily directed toward prevention of extrusion of the catalytic element through the flange at the casing exit end of the device and may not prevent slight longitudinal movement due to vibration or shock occurring on the overall catalytic gas treatment device. Consequently, the teaching of that patent may not prevent damage to the catalytic element end faces resulting from bumping of these end faces against the holding flanges due to vibration during operation at high temperatures.

The present invention is a catalytic gas treatment apparatus of the general type described and including expansible and/or resilient members for preventing undesirable consequences which otherwise might result because of variations in the rate of thermal expansion of different components of the apparatus and because of mechanical shocks to which the device is subjected during use. In accordance with the present invention, an expansible and/or resilient member is positioned between an end face of the catalytic element and the associated holding flange. In one embodiment of the present invention, the expansible members are bimetallic washers shaped like a Belleville spring, while in another embodiment, they are hollow, gas filled, thin metal shell pleated gaskets. Preferably, such an expansible member and holding flange are provided adjacent each end face of the catalytic element, although they may be provided adjacent only one, but either, end face. The expansible member is preferably compressed between the holding flange and the adjacent catalytic element end face when assembled. During use at elevated, but varying, operating temperatures, the distance between the holding flange and the catalytic element end face enlarges due to differences in thermal expansion rates of the several components, and upon occurrence of this enlargement, the expansible member expands to maintain contact with the holding flange and the catalytic element end face during essentially all conditions of use. In the following description this expansible member is sometimes referred to as a resilient member. These expansible members are of a geometry and of a material which result in their expansion to compensate for the difference in thermal expansion rates between the catalytic element and the casing. Therefore, a substantial gripping pressure of a proper magnitude is maintained on the catalytic element throughout the operational temperature range of the catalytic gas treatment device, preventing damage to the catalytic element which otherwise might occur as a result of contact of the catalytic element end face with the holding flange upon vibration of the exhaust gas treatment apparatus during high temperature operation. In addition, the expansible members, in conjunction with the holding flanges, prevent passage of the exhaust gas into the area between the catalytic element and the casing over the entire operational temperature range, thereby assuring that essentially all of the gas passes through the catalytic element. The expansible members can also be used cooperatively with other members placed between the end of the catalyst element and the holding flange. Although the expansible and/or resilient members can be utilized in accordance with the present invention without a resilient, flexible member encircling the catalytic element within the casing and without means for preventing either rotational or extended longitudinal movement of the catalytic element within the casing, the expansible and/or resilient members are also capable of use with such components, and generally such components are preferred in the exhaust gas treatment apparatus.

Figure 2:
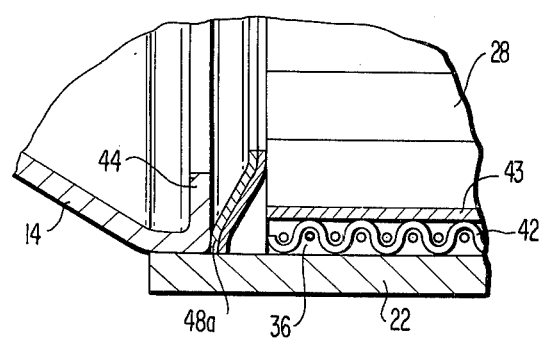
Figure 3:
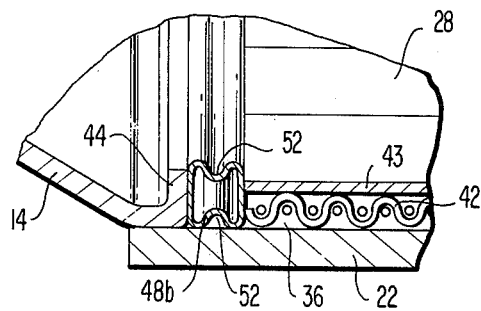
Figure 4:
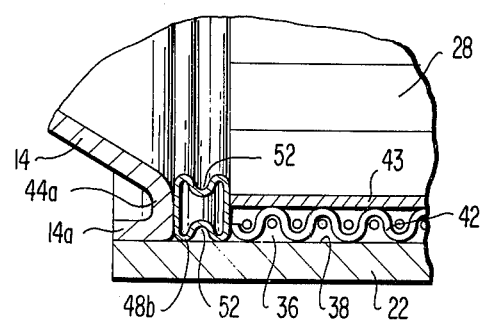

These and other aspects and advantages of the present invention are apparent in the following detailed description and claims, particularly when considered in conjunction with the accompanying drawings in which like parts bear like reference numerals. In the drawings:

FIG. 1 is a sectional view of a catalytic gas treatment apparatus in accordance with the present invention; and FIGS. 2 through 4 are each enlarged fragmentary sectional view of portion A—A of FIG. 1, illustrating some of the possible different embodiments of resilient members which can be incorporated into a catalytic gas treatment apparatus in accordance with the present invention.

Catalytic gas treatment apparatus 10, depicted in FIG. 1 as illustrative of the present invention, includes circular cylindrical body member 12 and frustoconical end closure members 14 and 16. Inlet conduit 18 is integral with frustoconical end member 14, and likewise, outlet conduit 20 is integral with frustoconical end member 16. Conduits 18 and 20 permit connection of catalytic gas treatment apparatus 10 to a source of exhaust gases, for example passing from an internal combustion engine. The exhaust gases may be mixed with oxygen, for example from a source of air, prior to entering conduit 18.

The main section of catalytic gas treatment apparatus 10 comprises a metallic casing 22 which typically might have a generally circular cross-section with a diameter in the order of from about two to about 8 inches, and a length in the order of from about two to about 12 inches. Frustoconical end members 14 and 16 abut the gas inlet and outlet ends respectively of casing 22 and are secured thereto, for example by welding. The members may have other than circular cross-sections.

Frustoconical end member 14 is dimensioned so as to enable distribution or passage of exhaust gases over the entire or substantially the entire cross-sectional area of the upstream portion of casing 22, thereby causing such exhaust gases to enter all or substantially all of the inlet openings 24 of the gas flow channels 26 in the unitary catalytic element 28 which is positioned within casing 22 and which has a cross-section of dimensions slightly less than those of casing 22. The inlet openings 24 are positioned over the entire or substantially the entire area of the inlet face 30 of the unitary porous ceramic supported oxidation catalytic element 28.

Frustoconical end member 16 is of dimensions similar to those of frustoconical end member 14, and thus of such dimensions as to enable free passage of gas out of the gas flow channels 26 via outlet openings 32 on outlet end face 34 of catalytic element 28. This free gas flow results in the passage of the gas from the gas flow channels without substantial back pressure buildup.

A layer 43 of, for instance, Fiberfax cement, a fibrous aluminum silicate, is preferably provided on the outer surface 40 of catalytic element 28 to seal the pores at the outer surface of the catalytic element and also to serve as a protective coating or padding. A space or gap 36 of substantially uniform width is defined between the inner surface 38 of casing 22 and the outer surface 40 of catalytic element 28. Space 36 extends completely around catalytic element 28 along the entire length of the catalytic element. In the preferred form of the invention, a resilient, flexible member 42 is positioned in space 36 and under compression between inner surface 38 of casing 22 and outer surface 40 of catalytic element 28. By way of example, resilient flexible member 42 might be a corrugated metallic structure which is foraminous such as a corrugated knitted metallic mesh fabric like that described in U.S. Pat. No. 3,441,381. An annular member or holding flange 44 extends radially inwardly of casing 22 to bridge the gap of annular space 36 between the inner wall surface 38 and the marginal edge portion of upstream face 30 of catalytic element 28. Holding flange 44 provides a continuous barrier around the periphery of catalytic element 28 to block flow of unpurified exhaust gas into space 36 without blocking an unduly large or significant number of inlet openings 24. Desirably, some of the inlet openings 24 can be blocked to insulate resilient member 42 and casing 22 from the heat of the reaction of the exhaust gases being treated and to retain heat in the catalyst. In the embodiment depicted in the drawings, annular flange 44 is integral with frustoconical member 14 and can be a thin, narrow-width rim or flange of substantially uniform thickness and width formed by bending inwardly the inner terminal end portion of frustoconical member 14 to a sufficient extent to form the radial annular flange 44, the plane of which extends substantially normal to the principal axis of casing 22. Typically, annular space 36 might have a width in the order of ⅛ inch, and annular flange 44 might extend inwardly from the inner surface 38 of casing 22 a distance in the order of ¼ inch.

A similar annular flange 44 extends radially inwardly of casing 22 to bridge annular space 36 at the gas outlet end face 34 of catalytic element 28. This flange 44 thus likewise provides a continuous barrier around the periphery of catalytic element 28 to block gas flow through annular space 36 without blocking the exit openings 32 of an unduly large or significant number of flow channels 26 in catalytic element 28. Likewise, outlet annular flange 44 may be integral with frustoconical end member 16 and can be a thin, narrow-width flange of substantially uniform thickness and width formed by bending inwardly the inner terminal end portion of frustoconical end member 16. This outlet end annular flange 44 extends radially inwardly from inner surface 38 of casing 22 a distance similar to the radially inward distance or width of inlet end annular flange 44, and its plane is likewise generally perpendicular to the principal axis of casing 22.

Resilient flexible member 42 has an uneven or ridged surface on both sides and is preferably corrugated. Member 42 snugly encompasses catalytic element 28 and contacts the inner surface 38 of cylindrical casing 22 to absorb mechanical shock and to compensate for the differences in a radial direction in thermal expansion of the metallic casing wall and the refractory ceramic support of catalytic element 28. Preferably, member 42 is a corrugated knitted mesh metallic fabric, due to the considerably greater flexibility and resiliency of the knitted mesh fabric than that, say, of a corrugated metal sheet. Preferably, also, upon assembly of member 42 within catalytic gas treatment apparatus 10, member 42 is subject to compression. The compressed, corrugated, knitted mesh fabric provides more points of contact with the catalytic element 28 and accordingly provides improved shock absorption and expansion compensation. Means may be provided to minimize rotational movement of catalytic element 28 within casing 22, as set out, for example, in U.S. Pat. No. 3,692,497.

A generally annular expansible and/or resilient member 48 is positioned between inlet flange 44 and inlet end 30 of catalytic element 28. A second expansible and/or resilient member 48 is positioned between outlet flange 44 and outlet end 34 of catalytic element 28. Expansible members 48 compensate for differences in thermal expansion in the longitudinal direction between metallic casing 22 and the refractory ceramic support of catalytic element 28. In addition, expansible members 48 absorb mechanical shock, particularly during high temperature operation of catalytic gas treatment apparatus 10. Preferably, as depicted in FIG. 1, the flanges 44 extend radially inwardly from inner surface 38 slightly further than expansible members 48 to prevent passage of untreated exhaust gases through the expansible members and thus through annular space 36 between casing 22 and catalytic element 28.

FIGS. 2–4 illustrate some possible configurations which expansible and/or resilient members 48 might have in accordance with the present invention. In FIG. 2, expansible member 48a is a bimetallic washer in the shape of an initially coned spring or Belleville spring. Belleville springs, generally, are known and are described, for example at pages 11-32 through 11-35 of Kents Mechanical Engineering Handbook, edited by Colin Carmichael, Twelfth Edition, John Wiley & Sons, Inc., New York, N.Y., 1950. Since it contacts radial flange 44 and catalytic element 28, washer 48a substantially blocks the untreated gases from annular space 36. The portion of bimetallic washer 48a which contacts flange 44 is of one metal, while the portion which contacts end face 30 is of the other metal. On initial assembly of catalytic gas treatment apparatus 10, the spring characteristics of bimetallic washer 48a maintain contact between washer 48a, flange 44 and end face 30. Because of the dissimilar coefficients of thermal expansion of the two metals from which washer 48a is made, the cross-sectional shape of washer 48a changes with increased temperature. Consequently, as the longitudinal distance between catalytic element 28 and flange 44 increases with increased temperature, washer 48a extends longitudinally to maintain contact with substantial pressure on catalytic element 28 and to block untreated gases from space 36.

FIG. 3 depicts an expansible member 48b in the form of a hollow, gas-filled, thin metal shell gasket having a pleat 52 in its inner surface and another pleat 52 in its outer surface. Pleats 52 provide resiliency to the hollow gasket and, in addition, permit expansion of the gasket due to expansion of the gas within the gasket at the same time the space between flange 44 and catalytic element 28 is enlarging due to differences in their expansion rates with increased temperature.

FIG. 4 depicts a variation in which frustoconical end member 14 terminates in an annular flange 44a which extends radially outwardly to inner surface 38 of casing 22, contacting expansible member 48, and then extends longitudinally outwardly to form rim 14a which abuts with casing 22. Flange 44a thus extends radially inwardly of casing 22 just as does flange 44 of FIGS. 2 and 3.

If desired, to provide further gripping of catalyst member 28, member 42 can have a greater length than does catalyst member 28 so that, when assembled, as depicted in FIG. 1, member 42 is slightly longitudinally compressed, abutting expansible member 48, either directly as depicted in FIG. 2, or against a shim. This causes member 42 to grip catalytic element 28 more firmly, thereby lessening the likelihood of its movement.

Although FIG. 1 depicts a preferred form of the invention, having a holding flange 44 and an expansible member 48 at both the inlet end and the outlet end of catalytic element 28, a satisfactory catalytic gas treatment apparatus might be provided with a single flange and a single expansible member, provided the single expansible member has sufficient resiliency to hold catalytic element 28 snugly at elevated operating temperatures. If a single flange and expansible member are provided, they preferably are adjacent gas outlet end 34 of catalytic element 28, since the gas flow through the catalytic element tends to cause movement of catalytic element 28 in that direction, and the expansible member 48 would provide cushioning.

The purification apparatus of this invention, exclusive of the unitary, refractory skeletal supported oxidation catalytic element 28 can be made of ferrous or nonferrous metals capable of withstanding the high temperatures to which the apparatus is subjected, for instance up to about 800°C. and even higher. The supported oxidation catalyst 28 can comprise a unitary, solid refractory skeletal structure of, for instance, cordierite as the support. Channels 26 may be of any of several cross-sections such as, for example, generally trapezoidal, rectangular, or hexagonal and are defined by corrugations and generally horizontal layers of the skeletal structure. An activated refractory metal oxide, for instance, a gamma family or activated-type alumina, can be formed on the surface of gas flow channels 26. The oxidation catalytic metal component can be carried by the active refractory metal oxide. The catalytic metal component can contain, for instance, a platinum group metal, base metal, or combinations thereof deposited on the active refractory metal oxide. Alternatively, the catalytic metal may also be deposited directly on the skeletal structure surfaces.

The unitary, skeletal structure support of the oxidation catalyst of this invention is characterized by having a large plurality of flow channels or paths extending therethrough in the general direction of gas flow. The supported catalyst is disposed in the purifier in such fashion that its unitary skeletal structure occupies the major part of the cross-sectional area of the reaction zone, with there being the narrow space between it and the purifier wall. Advantageously, the unitary skeletal structure is shaped to fit the reaction zone of the purifier casing in which it is to be disposed, and the unitary supported catalyst is placed therein lengthwise as to its cellular gas flow channels, i.e., with the channels extending in the general direction of gas flow so that the gases flow through the channels during their passage through the converter. The flow channels need not pass straight through the catalyst structure and may contain flow diverters or spoilers.

The skeletal structure support is preferably constructed of a substantially chemically and relatively catalytically inert, rigid, solid material capable of maintaining its shape and strength at high temperatures, for instance up to about 1100°C. or more. The support may have a low thermal coefficient of expansion, good thermal shock resistance, and low thermal conductivity. The support may be metallic or ceramic in nature or a combination thereof. Although the support may be a glass ceramic, it is preferably unglazed and may be essentially entirely crystalline in form and marked by the absence of any significant amount of glassy or amorphous matrices, for instance of the type found in porcelain materials. Further, the skeletal structure may have considerable accessible porosity as distinguished from the substantially non-porous porcelain utilized for electrical applications, for instance in spark plug manufacture, which is characterized by having relatively little accessible porosity. Whereas the superficial surface area of such structures may be of the order of 0.001 to 0.01 m.$^2$/g., including the channels, the total surface area is preferably many times greater, so that much of the catalytic reaction may take place in the large pores.

The geometric superficial or apparent surface area of the carrier including the walls of the gas flow channels will often be about 0.5 to 6, preferably 1 to 2.5, square meters per liter of support. The channels through the unitary body or skeletal structure can be of any shape and size consistent with the desired superficial surface and should be large enough to permit free passage of the gas mixture of exhaust gas and oxygen-containing gas. The channels may be parallel or generally parallel and extend through the support from one side to an opposite side, such channels being separated from one another by preferably thin walls. The channels may also be multi-directional and may even communicate with one or more adjacent channels. The channel inlet openings can be distributed across essentially the entire face or cross-section of the support subject to initial contact with the gas to be reacted. The preferred skeletal structure supports are comprised of one or more of cordierite, cordierite-alpha alumina, zircon-mullite, spodumene, alumina-silica-magnesia and materials utilizable in place of the preferred materials as support or carrier are sillimanite, magnesium silicates, zircon, petalite, alpha-alumina and aluminosilicates.

The gas flow channels of the unitary ceramic skeletal supported catalyst may be thin-walled channels providing a relatively large amount of superficial surface area. The channels can be one or more of a variety of cross-sectional shapes and sizes. The channels can be of the cross-sectional shape, for example, of a trapezoid, rectangle, square, sinusoid, or circle so that cross-sections of the support represent a repeating pattern that can be described as a honeycomb, corrugated or lattice structure. The walls of the cellular channels are generally of a thickness necessary to provide a strong unitary body, and the thickness will often fall in the range of about 2 to 10 mils. With this wall thickness, the structure may contain from about 100 to 2500 or more gas inlet openings for the flow channels per square inch and a corresponding number of the gas flow channels, preferably about 150 to 500 gas inlets and flow channels per square inch. The open area of the cross-section may be in excess of 60% of the total area. The size and dimensions of the unitary refractory skeletal support of this invention can be varied.

The refractory metal oxide in the preferred embodiment of the catalyst is deposited on the unitary skeletal support as continuous or discontinuous thin deposits preferably of thickness of about 0.0004 inch to 0.001 inch. Such catalytically-active oxide may be a calcined refractory metal oxide which itself is characterized by a porous structure and which possesses a relatively large internal pore volume and total surface area. Generally, the total surface area of the active refractory metal oxide is at least about 25 square meters/gram. Such oxides can be prepared by dehydrating the hydrate form of the oxide by calcination usually at temperatures of about 150°C. to 800°C. The preferred active metal oxides contain members of the gamma or activated alumina family which can be prepared, for instance, by precipitating hydrous alumina gel and thereafter drying and calcining to expel hydrated water and provide the active alumina.

In operation, the exhaust gases from an internal combustion engine, for instance that of a spark-ignition, reciprocating, internal combustion engine of an automobile or fork-lift truck, and containing combustible, air-polluting constituents, for instance hydrocarbons, oxygenated hydrocarbons and carbon monoxide, pass at high velocity from the engine exhaust system in admixture with an amount of oxygen required for the combustion of the combustible constituents, and preferably in excess of the stoichiometric amount required for such combustion. The oxygen may be present in the exhaust gases as the result of the engine burning a lean fuel mixture, or oxygen, for instance, as air, may be added to the exhaust gases. The exhaust gases containing oxygen pass at elevated temperature within inlet conduit 18 of catalytic purifier 10, and into and through the multiplicity of flow channels 26 extending through supported oxidation catalyst 28. The gaseous admixture contacts the active catalyst component within the superficial macropores of porous catalyst support 28 and also on the surface of the flow channels 26 at a temperature of the supported catalyst of typically about 150° – 700°C., whereby the combustible air-polluting constituents are oxidized to more innocuous gases such as $CO_2$ and $H_2O$. The thus-purified gases are then passed from purifier 10 through discharge conduit 20 either directly into the atmosphere or into a tail pipe or conduit for ultimate discharge to the atmosphere. During this operation, the catalyst element is held stationary within casing 22.

I claim:

1. Apparatus useful for purifying gases comprising:
   a casing defining an enclosed space;
   means defining a gas inlet communicating with the enclosed space;
   means defining a gas outlet communicating with the enclosed space;
   a ceramic structure in the enclosed space and having a unitary, skeletal structure with a plurality of gas inlets, a plurality of gas outlets, and gas flow paths through the skeletal structure from the gas inlets to the gas outlets, said ceramic structure being positioned in said casing to provide a space therebetween;
   a catalyst structure supported on said ceramic structure;
   a first flange member adjacent the periphery of a first end of the ceramic structure and positioned inwardly with respect to said casing to bridge said space between said casing and said ceramic structure and positioned over the marginal edge portion of said ceramic structure; and
   a first pleated, hollow, thin metal shell gasket member filled with a heat-expansible gas, said gasket member being freely axially and radially movably positioned under compression between the first flange member and the ceramic structure to provide a resilient, expansible connection between the first flange member and the ceramic structure and to thereby provide a substantial mounting pressure of the proper magnitude so as to grippingly hold said ceramic structure over the temperature range experienced by the apparatus.

2. Apparatus as claimed in claim 1 further comprising a resilient member surrounding said ceramic structure and positioned in the annular space between said ceramic structure and said casing.

3. Apparatus as claimed in claim 1 further comprising:
   a second flange member adjacent the periphery of the second end of the ceramic structure and positioned inwardly with respect to said casing to bridge said space between said casing and said ceramic structure and positioned over the marginal edge portion of said ceramic structure; and
   a second pleated, hollow, gas-filled, thin metal shell gasket member positioned under compression between the second flange member and the ceramic structure to provide a resilient connection between the second flange member and the ceramic structure and to grippingly hold said ceramic structure over the temperature range experienced by the apparatus.

4. Apparatus as claimed in claim 1 in which the first flange member is adjacent the ceramic structure gas outlets.

5. Apparatus as claimed in claim 4 in which the first flange member and the gas outlet defining means are integral.

6. Apparatus as claimed in claim 5 in which the gas outlet defining means comprises a frustoconical member, the larger end of which abuts the casing and then turns radially inwardly to form the first flange member.

7. Apparatus as claimed in claim 5 in which the gas outlet defining means comprises a frustoconical member, the larger end of which turns radially outwardly to form the first flange member which abuts the casing.

* * * * *